G. Rector,
Mower.
No. 78,482.   Patented June 2, 1868.
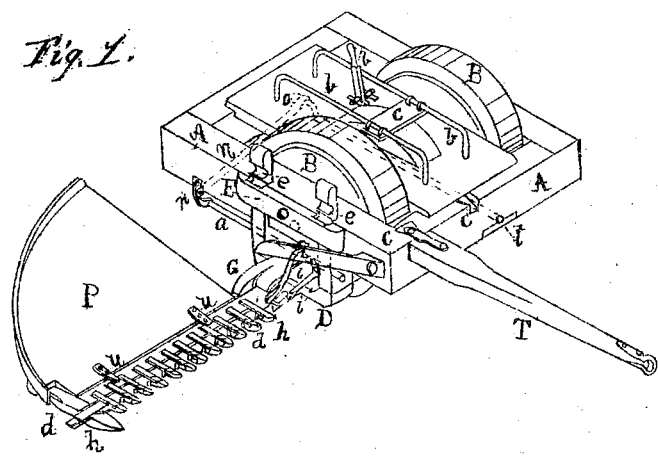
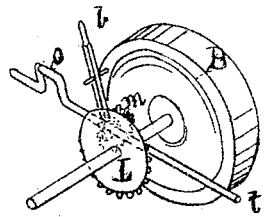
Witnesses,
P. T. Dodge.
G. W. Bridgman.
Geo. Rector,
Inventor.
by Dodge & Munn
his attys.

UNITED STATES PATENT OFFICE.

GEORGE RECTOR, OF SODUS, MICHIGAN.

IMPROVEMENT IN HARVESTERS.

Specification forming part of Letters Patent No. 78,482, dated June 2, 1868.

*To all whom it may concern:*

Be it known that I, GEORGE RECTOR, of Sodus, in the county of Berrien and State of Michigan, have invented certain new and useful Improvements in Reaping-Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in certain improvements in that class of machines used for cutting hay and grain, and usually denominated "reapers," which said improvements will be hereinafter explained.

Figure 1 is a perspective view of my improved machine complete, and Fig. 2 is a perspective view of a portion detached.

A represents the frame, which may be constructed in any suitable manner, and is mounted on two wheels, B, on the axle of which is secured a bevel-gear wheel, L, as shown in Fig. 2. Upon the frame a seat, C, is mounted centrally on two rods, *b*, extending longitudinally, and raised above the frame, as shown in Fig. 1, so that the seat may be shoved forward or back thereon, and thus balance the machine by the weight of the driver, and prevent the tongue from bearing heavily on the animal's neck. The frame A is provided at its front with two dovetailed recesses, *c*, into which the rear end of the tongue is made to fit, one of these recesses being at the center and the other near one corner of the frame A, as shown in Fig. 1, so that the tongue may be changed from one to the other, as may be necessary, to compensate for side draft, or to place three horses abreast.

Upon the side of the frame A is placed a vertical U-shaped frame, D, to which the cutting apparatus is hinged, as shown in Fig. 1. This yoke or frame D has a series of notches, *e*, formed in its face, into which a bar, E, fits, this bar being secured by a bolt to the frame A, and thus securing the frame D to the main frame. There being a series of these notches *e*, the frame D, with the cutting apparatus, may be adjusted at any desired height by simply loosening the bolt that holds the bar E in place.

At the bottom the frame D is provided with a short horizontal arm, to which the cutter-bar is hinged, and on its rear side this arm has a portion extending out alongside of and against the rear face of the finger-bar, as shown by G, Fig. 1, this extended arm thus serving as a support or brace to prevent the finger-bar from swaying backward.

It will be observed that the frame D and the cutter-bar are placed directly opposite and in line with the wheels of the machine, so that as the wheels rise or fall the same motions will be imparted to the cutter-bar, and hence it will at all times keep the same relative position as to the ground, and the raising or lowering of front or rear of the frame will not affect the cutter-bar or sickle.

I use two sickle-bars, *d* and *h*, and connect them, by pitmen *i*, to arms on a rock-shaft, *a*, running along the inner side of the frame, as shown in Fig. 1. At its rear end this rock-shaft has a crank, *r*, provided with a series of holes, from any one of which a connecting rod or pitman, *n*, extends to the crank *o* of shaft *t*, on which is placed a sliding bevel-gear, *m*, arranged to be thrown in or out of gear with the bevel-wheel L on the axle of the machine.

As the machine is moved forward, motion is thus imparted to the sickles *d* and *h*, whenever, by means of the lever *l*, the gear-wheels L and *m* are put in connection; and, as the lever *l* is so located as to be at all times within reach of the driver, the mechanism may be set in operation or stopped at any instant. By means of the rock-shaft, having its arms to which the sickles are connected projecting from it on opposite sides, the sickles are made to move in opposite directions, and by means of the series of holes in the crank *r* of the rock-shaft, the stroke of the sickles may be increased or decreased at will, and thus the machine is the better adapted to cutting all varieties of grains and grasses, some requiring a longer and others a shorter stroke of the sickle-bar.

By this method of constructing the machine, I am enabled to produce a very simple, compact, and efficient mower and reaper, one that can be adjusted readily for either purpose by simply attaching or detaching the platform P by means of the metal straps $u$, and the cut of which can be regulated or adjusted at will, to adapt it to the different kinds of material to be cut.

Having thus described my invention, what I claim is—

1. The arrangement of the rock-shaft $a$ and the two sickle-bars $d$ and $h$, the latter being located in line with the tread of the wheels, and hinged to the adjustable yoke D, substantially as described.

2. The U-shaped frame D, with the horizontally-projecting arm, to which the finger-bar is hinged, and having the projecting brace-bar G arranged to bear against the rear side of the finger-bar, said frame D being adjustable vertically, all constructed and arranged to operate as herein described.

3. The combination of the driving-gear L, crank-shaft $t$, with its sliding gear $m$, pitman $n$, and rock-shaft $a$, when said parts are constructed and arranged to operate as and for the purpose set forth.

4. The combination of the two sickle-bars $d$ and $h$, pitman $i$, and rock-shaft $a$, provided with its two arms and crank $r$, having a series of holes for adjusting the stroke, as herein set forth.

GEORGE RECTOR.

Witnesses:
W. R. LYON,
SAML. JACKSON.